United States Patent

[11] 3,613,668

| [72] | Inventors | Charlotte Beck<br>Stuttgart-Mohringen;<br>Karl Roll, Oberaichen, Wurttemburg; Fritz<br>Kummer, Stuttgart, all of Germany |
|---|---|---|
| [21] | Appl. No. | 811,940 |
| [22] | Filed | Apr. 1, 1969 |
| [45] | Patented | Oct. 19, 1971 |
| [73] | Assignee | Walter Beck KG. Kontroll-und<br>Fernmessgerate<br>Stuttgart-Mohringen, Germany |
| [32] | Priority | Apr. 1, 1968 |
| [33] | | Switzerland |
| [31] | | 4943/68 |

[54] SPHYGMOMANOMETER WITH BUILT-IN TIMER
17 Claims, 10 Drawing Figs.

[52] U.S. Cl. .................................................. 128/2.05 G
[51] Int. Cl. .................................................. A61b 5/02
[50] Field of Search........................................ 128/205 A,
205 C, 205 M, 205 F, 205 R, 205 S, 205 Q; 73/40
Z; 58/46, 46.5

[56]         References Cited
          UNITED STATES PATENTS
2,524,470  10/1950  Pagnard ..................... 58/46 X

| 2,560,237 | 7/1951 | Miller............................ | 128/2.05 U |
| 2,630,796 | 3/1953 | Eksten, Jr..................... | 128/2.05 U |
| 2,934,061 | 4/1960 | Spellman...................... | 128/2.05 U |
| 3,254,671 | 6/1966 | Berliner........................ | 128/2.05 U |
| 3,482,564 | 12/1969 | Robinson ..................... | 128/2.05 U |

FOREIGN PATENTS

| 230,942 | 2/1911 | Germany...................... | 128/2.05 U |

*Primary Examiner*—William E. Kamm
*Attorney*—Karl F. Ross

ABSTRACT: A sphygmomanometer operable with one hand has a cylindrical housing in which a pump for inflating a blood-flow-restricting sleeve is formed by a deflectable wall of the cylindrical housing. A meter for monitoring pressure is removably fitted on the end of the housing, and a control ring surrounds the housing axis between the meter and pump. A valve for bleeding the air from the sleeve is operated by rotation of the control ring. Means are provided for centering the pointer of the meter at a zero indication and for establishing the desired ratio of pressure to meter displacement. A timer is also provided which has a dial on the meter face and which is controlled by the ring.

3,613,668

PATENTED OCT 19 1971

CUFF

INVENTORS:
Charlotte Beck
Karl Roll
Fritz Kummer

BY

Karl F. Ross

ATTORNEY

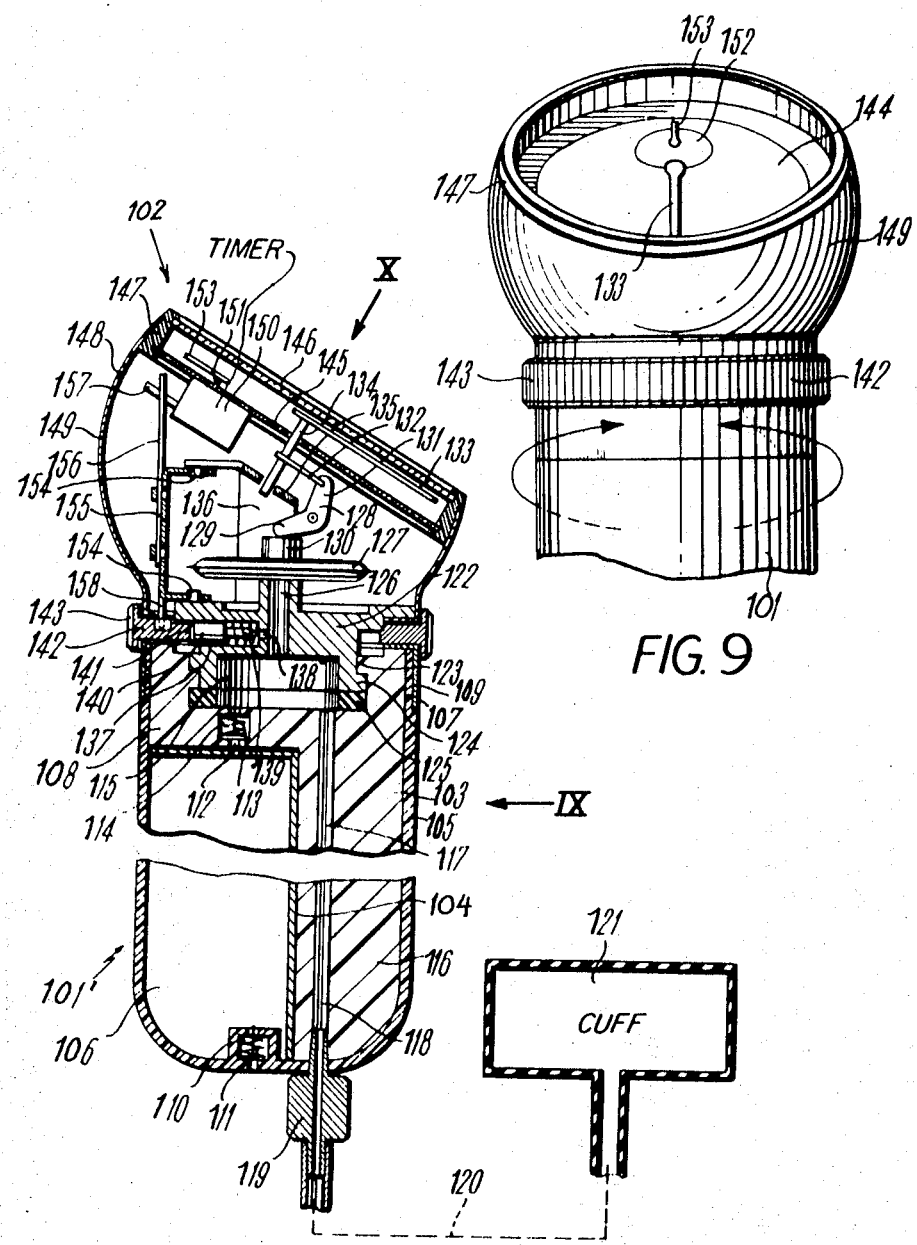
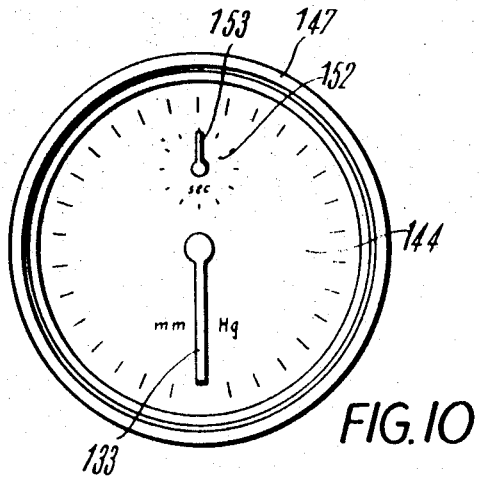

SPHYGMOMANOMETER WITH BUILT-IN TIMER

The present invention relates to a sphygmomanometer usable with an inflatable sleeve for measuring human blood pressure.

Several devices for this purpose are known. One prior sphygmomanometer usually comprises a bulb connected to the sleeve and the blood pressure meter by flexible tubes with a check valve permitting the bulb to suck in air and a bleed valve for controlled dropping of the pressure in the sleeve. More than a little skill is required to manipulate the stethoscope used to monitor the blood flow, the pump for pressurizing the sleeve and the valve which bleeds it, and the pressure gauge. The gauge, the bulb, the stethoscope and the sleeve must all be handled separately.

Attempts to combine some of this equipment into an easily manipulatable unit have been far from successful. One of the more successful attempts has been to mount the pump on a pistol-type grip. This however was very clumsy to handle and did not allow a fine control of the bleeding of the sleeve which is necessary for accurate blood pressure readings.

It is therefore the principal object of the present invention to provide an improved sphygmomanometer.

A more specific object is to provide a sphygmomanometer which overcomes the above-mentioned disadvantages.

The above and other objects are attained, in accordance with the instant invention, by providing a sphygmomanometer comprising a cylindrical housing carrying at one end a meter. The housing has a stiff synthetic-resin core formed with an indentation of hollow over which an elastic skin or cover is stretched to form both the cylindrical wall of the housing and a bulb or pump. A rotatable ring surrounds the housing adjacent the meter and is formed with an eccentric camming surface that operates a bleed valve.

The bulb or pump means communicates via a check valve with the ambient atmosphere, and through a filter and another check valve with a chamber that in turn communicates with the inflatable sleeve or cuff which fits about the arm of the patient. This chamber also communicates with a closed compartment having one wall displaceable by pressure, i.e. a diaphragm capsule, whose output pin or stud is threaded and fitted with a nut on which one arm of a double-arm lever rides. The other arm is connected to the shaft carrying the needle indicator. An arrangement is provided to move the pivot pin of the double-arm lever closer to or further from the capsule pin. Thus a zero setting can be accomplished with the help of the nut, and the lever ratio can be adjusted by displacing the pivot, thereby calibrating the instrument.

A relatively small bleed opening or vent opens into a larger valve cylinder or bore with a small groove leading to the wall of the larger bore. A plunger which consists of two telescoping portions between which washers can be placed to change its length has a soft rubber face which can be pressed against this bleeding bore and the radial groove to block them completely. The opposite end of the piston is engaged by an eccentric camming surface on the inside of the rotatable ring such that when this is turned it can either completely block the bore, completely free it, or hold at any intermediary position.

The upper, meter portion of the sphygmomanometer according to a feature of our invention is connected to the housing by means of a simple bayonet fastening or plug-type screw thread arrangement to allow easy disassembly and repair.

According to yet another feature of our invention, a small short-interval timer, as described in the commonly owned concurrently filed application Ser. No. 811,833 of one of the present inventors, is also included in the sphygmomanometer. This has a small indicator and a dial on the same dial face as the pressure indicator. In addition, in order to limit complications in our device, this timer is also actuated by the rotating ring.

Thus, the sphygmomanometer of the present invention is easy to use with a single hand. The sleeve or cuff can be pumped up by alternately squeezing and releasing the housing, then it can be slowly bled by rotating the ring between two fingers of the same hand, and finally pulse can be counted, starting with an actuation of the times through this ring. Other advantages offered by the system of the present invention are the accuracy and ease with which it may be adjusted, and the simplicity in taking it apart if repairs are necessary.

The above and other objects, features, and advantages will be more fully described in the following, with reference to the accompanying drawing, in which:

FIG. 8 is a longitudinal section through a third embodiment of our invention; and FIGS. 9 and 10 are views taken in the direction of respective arrows IX and X of FIG. 8.

Figure 1:
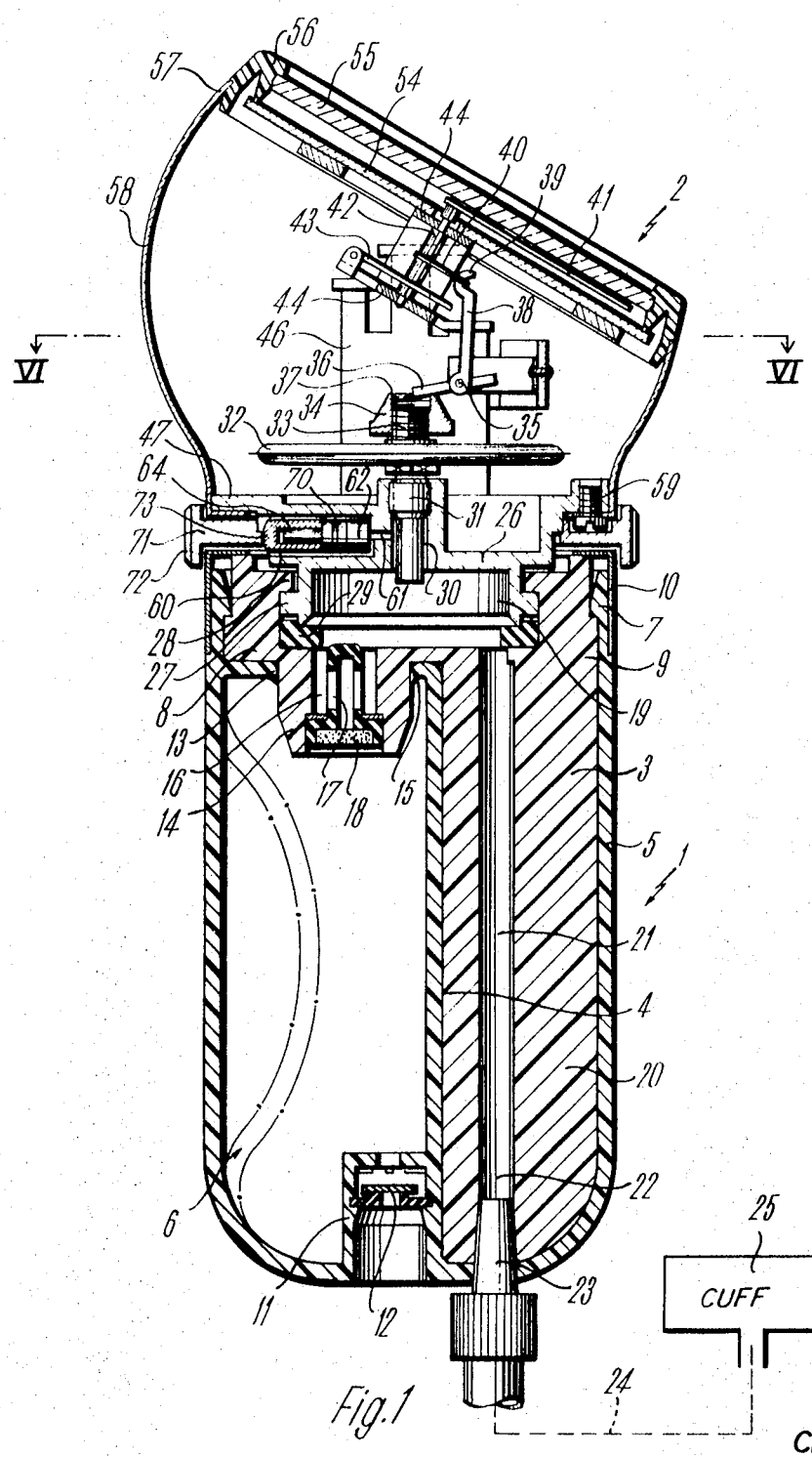
FIGS. 1 and 2 are longitudinal sections through two embodiments of our invention.

As shown in FIG. 1, a cylindrical housing 1 has a meter 2 mounted at one end. The housing 1 consists of a relatively stiff synthetic-resin core 3 formed with a hollow 4 with an elastic cover 5 stretched over the whole, spanning the hollow 4 to form a pump or bulb 6. The upper edge 7 of this cover 5 grips a circular rim 9 on a top portion 8 of the core 3, with a circular retaining ring 10 holding it in place.

The bulb 6 is formed at the bottom with a pocket 11 in which an inlet check valve 12 is retained. At the top the cover 5 is formed with an opening 13 through which a projection 14 formed with a pocket 16 passes. The cover 5 closely hugs this projection 14 with edges 15 to prevent air leakage. A slit-type outlet check valve 17, whose slits close when the pump is released, and a filter 18 are mounted in the pocket 16.

A central chamber 19 in the upper portion 8 communicates through a longitudinal bore 21 through a foot 20 of the core 3 and through the cover 5 via a quick-release pressure coupling 23 and, a conduit 24 to a sleeve 25. Thus a connecting means comprising the chamber 19, bore 21, coupling 23, and conduit 24 is formed between the bulb 6 and sleeve 25.

The meter part 2 has a base 26 formed with four bayonets 27 that engage in slots under a rim 28 of the portion 8. A rubber washer 29 prevents air leakage here.

Figure 6:
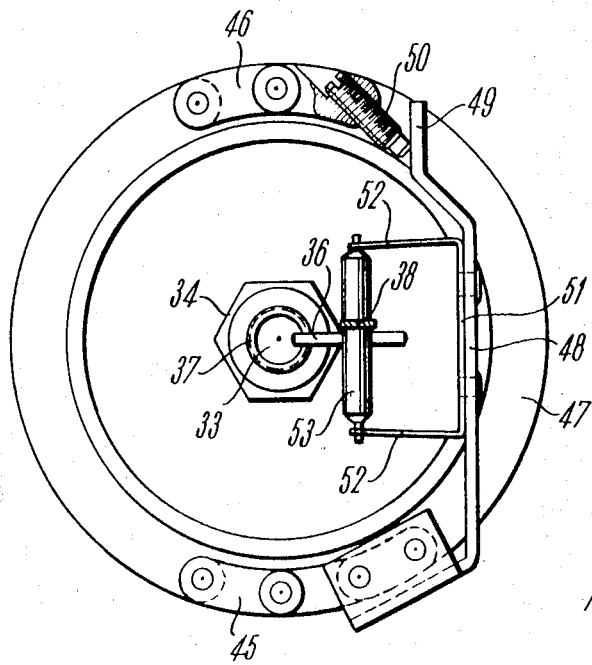
FIGS. 6 and 7 are sections along lines VI—VI and VII—VII of FIGS. 1 and 2 respectively.

An axial bore 30 in which a nipple 31 of a diaphragm capsule 32 is screwed opens into this chamber 19. A threaded stud 33 atop this capsule 32 mounts a nut 34. As also shown in FIG. 6, a two-arm lever 35 has one leg 36 bearing on a rim 37 of this nut 34 and another leg 38 hooked in the shackle 39 of a chain 40 wound around a shaft 42 on which a pointer 41 is mounted. A spiral spring 43 biases this pointer 41 to the zero position while the shaft 42 is journaled in two plates 44 held between supports 45 and 46 fixed to a rim 47 of the base 26. One end of a leaf spring 48 is mounted on the support 45 and its free end 49 rests against a screw 50 threaded in the support 46. A yoke 51 with arms 52 is riveted onto the spring 48 and carries a pivot pin 53 journaled between the arms 52. The two lever legs 36 and 38 are firmly attached to this pin 53.

The shaft 42 passes through a dial plate 54 fixed on the supports 45 and 46. A glass faceplate or window 55 mounted in a synthetic-resin gasket 56 in turn fitted on a rim 57 of a semi-spherical housing 58 for the meter 2 covers and protects the dial 54. This semispherical housing 58 is held by screws 59 to the rim 47 of the base 26 of the meter 2.

Figure 3:
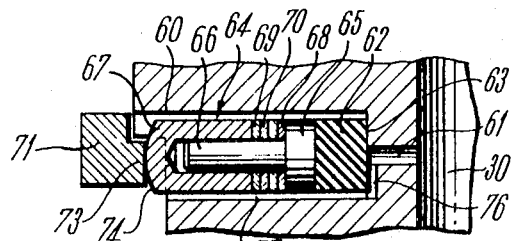
FIG. 3 is a detail of FIG. 1, in enlarged scale.
Figure 4:
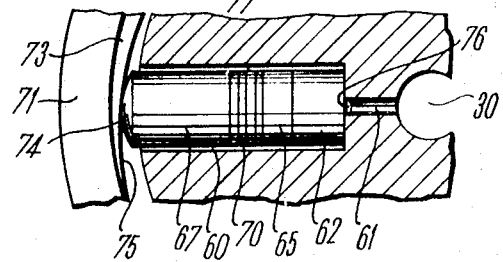
FIG. 4 is a top view of FIG. 3.

A radial cylindrical bore 60 in the base 26 communicates through a relatively narrow bore 61 with the opening 30. As more clearly shown in FIGS. 3 and 4 a short cylindrical rubber body 62 bears with a face 63 against the bore 61. Behind this rubber 62 is the remainder of a valve body comprising a cylindrical cup 67 in which a shaft 66 of a further cylindrical body 65 is received. Between facing surfaces 68 and 69 of these telescoping bodies 64 and 65 a plurality of washers 70 may be fitted to adjust the bleed valve formed thereby. A ring 71 formed with mills 72 surrounds the upper end of the housing 1 and is formed with an inner portion 73 having an eccentric camming surface 75 engaging an end bore 74 of the valve body 62–70. A small radial bore 76 communicates between the bore 61 and a space 77 surrounding the valve body.

Our improved sphygmomanometer is used as follows:

After the sleeve 5 is fitted to a subject in the accustomed manner, the ring 71 is turned to force the elastic body 62 against the bore 61 and into the groove 76 to block air flow through them completely. Then alternate compressing and releasing of the bulb 6, as shown by dot-dash lines in FIG. 1, pressurizes this sleeve 25.

Once pressure in the sleeve 25 reaches a level sufficient to stop blood flow, the ring 71 is turned to free the bore 61 and allow air to slowly bleed out the sleeve 25. Due to the very gradual "slope" of the camming surface a very exact control of the bleeding speed can be maintained. As the sleeve 25 is bled, the systolic and diastolic blood pressure readings are carried out in the accustomed manner.

In order to initially adjust the meter the pointer 41 is simply mounted on the shaft 42 to read near "zero" with no pressure. Then a finer adjustment can be carried out by screwing the nut 34 up or down, as required, on the stud 33. Then, for calibration, the capsule 32 or the entire connecting means may be pressurized to a predetermined pressure level. Should the pointer be off its mark, the screw 50 can be adjusted to set it at the right reading. This may require some slight readjusting of the nut 34 to reset the pointer 41 at zero, but with at most a few tries the proper zero setting and lever ratio necessary for complete accuracy should be reached.

We have found that for best accuracy and smoothness of operation the device should be adjusted with the lever arm 36 to be about horizontal or parallel to the nut 34 in the region of normal human blood pressure.

Figure 2:
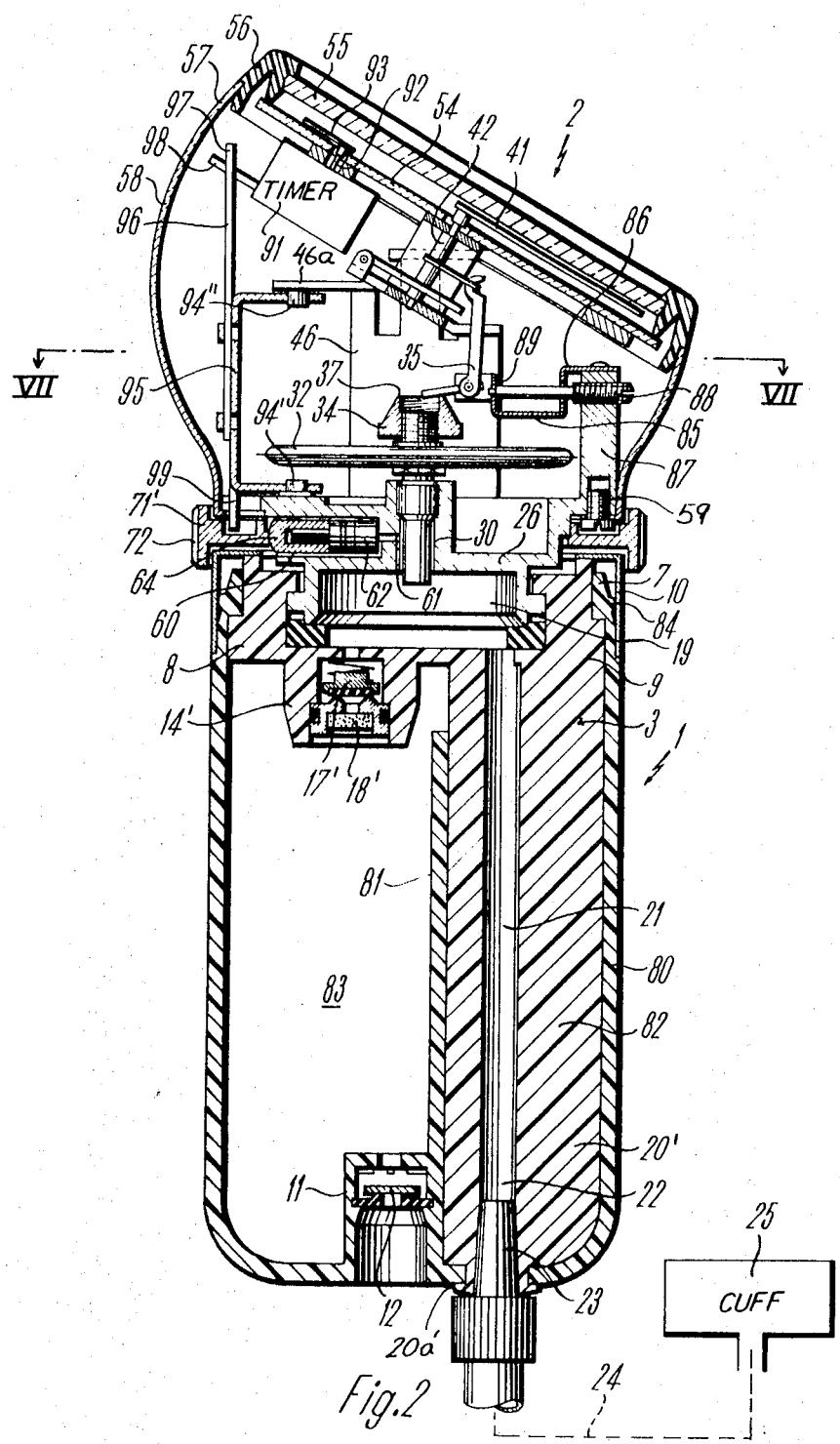
Figure 5:
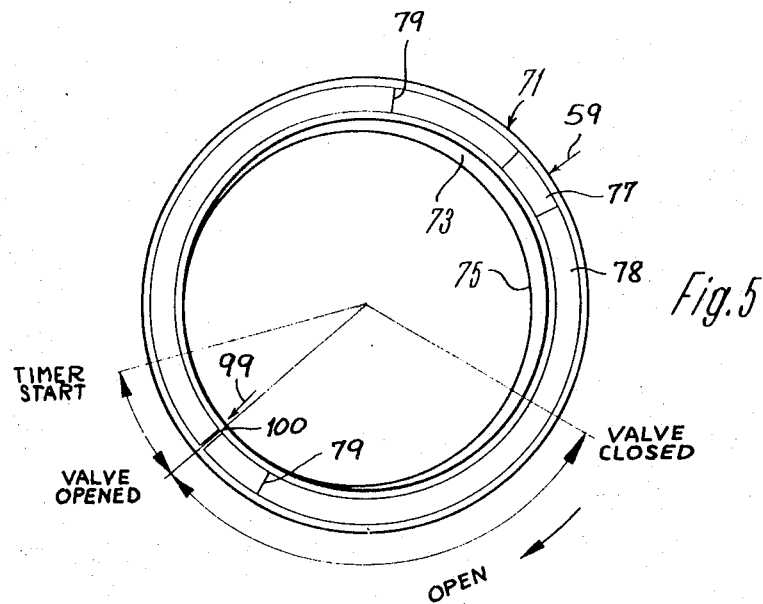
FIG. 5 is a top view of the control ring of our invention.
Figure 7:
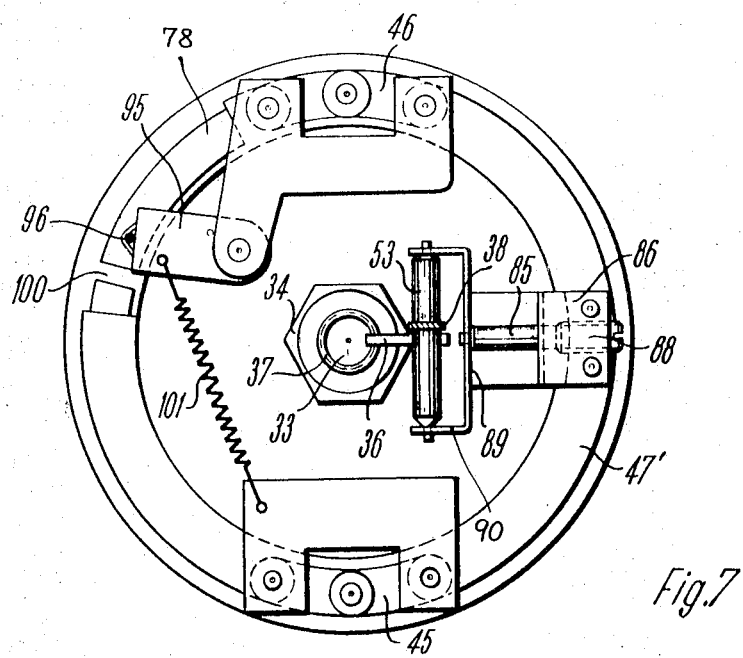

FIGS. 2, 5, and 7 show a second embodiment of the sphygmomanometer of the invention wherein structure identical to the embodiment of FIG. 1 bears reference numerals as in FIG. 1.

Here the core 3 has a lower end 20' formed with a grommet 20'a in which the connection 23 is received and a projection 14' in which a conventional outlet check valve 17' and filter 18' are mounted.

Here a synthetic-resin cover 80 on the core 3 is divided into two pockets 82 and 83 by a wall 81. The pocket 83 forms the bulb or pump in this embodiment. In addition, the cover 80 has a thickened upper rim 84 held in place by the ring 10. Due to the different construction here, it is important to seal the cover 80 very well around the rim 84.

As also shown in FIG. 7 a rim 47' of the base 26 mounts a shaped leaf spring 86 on a post 87 through which an adjustment screw 88 passes. The end of the adjustment screw 88 engages an end 89 of the spring 86 carrying a yoke 90 in which the pivot pin 53 of the two-arm lever 35 is journaled as before. Thus, here the screw 88 fulfills the function of the screw 50 of FIG. 6.

A short-interval timer 91 is mounted on the back of the dial 54 and carries a pointer 93 on a shaft 92 for indicating elapsed time in seconds. A U-shaped strip 95 pivotal between one pin 94' mounted on the base 26 and a second pin 94'' on an arm 46a of the support 46 carries a longitudinally displaceable upper arm 96 having an end 97 engageable with an actuating lever 98 of the timer 91. It also carries a rod 99 engageable with a boss in the form of a ridge 100 in a groove 78 in a ring 71'. A spring 101 attached between the strip 95 and the support 45 biases the former into the FIG. 7 illustrated position. The groove 78 in the ring 71' is further provided with a small leaf spring 77 and stops 79 to retain the ring in its operative positions.

This second embodiment is operated as follows: After the blood pressure has been measured as described above the ring 71' is rotated to fully open the bleed valve, with the screw 59 engaging the spring 77 as best illustrated in FIG. 5. Continued turning of the ring 71', forcing the spring 77 by the screw 59 brings the ridge 100 into contact with the rod 99 and thus moves the arm 98 of the timer 91 over. The arm 98 is moved fully over and when the ring 71' is released with the spring 101 pulling the bent strip 95 back, the timer starts. The short cranking of the arm 98 suffices to wind the timer 91 for several minutes running time, during which the patient's pulse can easily be taken.

As shown in FIGS. 8 through 10, the sphygmomanometer according to the present invention comprises a cylindrical housing 101 on which a meter 102 is mounted. The housing 101 consists of a synthetic-resin core 103 formed with a hollow 104 over which elastic plastic skin 105 is spanned to form a bulb 106. An upper edge 107 of the skin 105 is held tightly against an upper end 108 of the core 103 by a metal ring 109. The bulb 106 is formed at its lower end with a pocket 110 in which a conventional inlet check valve 111 is mounted. The upper portion 108 of the core 103 is similarly formed with a pocket 114 which communicates with the bulb 106 through an opening 112 and houses a check valve 113.

A chamber 115 is connected by a bore 117 through a lower portion 116 of the core 103 to a conventional blood-restricting sleeve 121 which has a tube 120 whose end connection 19 plugs into an extreme lower end 118 of the bore 117. The check valve 113 permits air flow from the bulb 106 into the chamber 115.

A base 22 of the meter 2 is coupled to the core 3 by a one-turn thread 124 on the base 122 engaged in a thread 123 of the upper portion 108, and is sealed by a washer 125.

A further bore 126 in the base 122 connects a capsule 127 having a top wall displaceably by air pressure and fitted with a stud 130 against which one arm 129 of a two-arm lever 128 bears. Another arm 131 of this lever 128 is attached via a chain 132 to shaft 134 journaled in a plate 135 mounted on a support and carrying a pointer 133.

A bore 137 formed in the base 122 communicates with the bore 126 through a pore 138. A valve body 140 having a pointed shaft 139 engageable in this pore 138 can completely or partially block airflow therethrough. An end 141 of this body 140 is engageable by a camming surface of a control ring 142 formed with mills 143. Thus rotation of the ring 142 can open or close the pore 138 and thereby control bleeding therethrough.

A pressure scale 144 is printed on a dial plate 145 through which the shaft 134 passes. A glass or window 146 mounted in a gasket 147 fitted on a rim 148 of a hemispherical meter housing 149 protects the scale 144 and pointer 133.

Also mounted on the dial plate 145 is a short-interval timer 150 having a shaft 151 mounting a pointer 153 associated with its own second scale 152. A pivot pin 154' mounted on the support 136 and a pivot pin 154'' on the base 122 serve to journal a U-shaped strip 155 which mounts a bar 156 engageable with an actuating lever 157 of the timer 150. The U-shaped strip 155 also carries a pin 158 with an end of a groove 159 formed in the control ring 142.

This third embodiment is used and operated as the above-described embodiments. Its principal advantages are its simplicity of construction and low production cost.

The improvement described and illustrated is believed to admit of many modifications within the ability or persons skilled in the art, all such modifications being considered within the spirit and scope of the invention except as limited by the appended claims.

We claim:

1. A sphygmomanometer comprising, in combination with a fluid-pressurizable blood-flow-restricting sleeve:
    an elongated cylindrical housing having a relatively stiff cylindrical core formed with a laterally open hollow over most of the length of the core and housing;
    hand-actuatable pump means in said housing connectable with said sleeve for pressurizing same, said pump means including a relatively elastic skin over said core spanning said hollow and forming therewith a substantially airtight chamber extending over most of the length of the housing;
    meter means on an end of said housing and mounted on said core for indicating a fluid-pressure level in said sleeve;
    a rotatable ring on said housing; and valve means in said housing operable by said rotatable ring for bleeding pressurized fluid from said sleeve.

2. The sphygmomanometer defined in claim 1 wherein said ring 15 substantially coaxial with said housing at said end thereof and being rotatable about the longitudinal axis of said housing.

3. The sphygmomanometer defined in claim 2, further comprising airtight connecting means interconnecting said chamber and said sleeve, said housing being provided with a first check valve permitting airflow from the exterior into said chamber and a second check valve permitting airflow from said chamber into said connecting means.

4. The sphygmomanometer defined in claim 3 wherein said meter means includes sensing means responsive to pressure in said connecting means, and said valve means comprises a controllable valve communicating between the ambient atmosphere and said connecting means.

5. The sphygmomanometer defined in claim 4 wherein said sensing means includes a closed compartment communicating with said connecting means and having a pressure-displaceable wall, and a double-arm lever having one arm bearing on said wall, said meter means including a pointer, a pivotal shaft carrying said pointer, and means connecting said shaft to the other arm of said lever.

6. The sphygmomanometer defined in claim 5, further comprising adjustment means between said wall and said one arm for varying the distance therebetween in a nonactuated condition of said sensing means.

7. The sphygmomanometer defined in claim 6 wherein said adjustment means comprises a stud mounted on said wall and a nut threadedly engaging said stud, said one arm bearing on said nut.

8. The sphygmomanometer defined in claim 7, further comprising a yoke fired to said housing, a pin mounted between the arms of the yoke, and means for displacing said yoke toward and away from said nut, said lever being mounted on said pin.

9. The sphygmomanometer defined in claim 4 wherein said valve means includes a valve body formed with a first bore open at one end to the ambient atmosphere and a second relatively narrower bore extending between said connecting means and the other end of said first bore, and a valve member for blocking said other end of said first bore.

10. The sphygmomanometer defined in claim 9 wherein said ring has an inner periphery formed with a camming surface operatively connected with said valve member to force same toward said other end of said first bore to block same.

11. The sphygmomanometer defined in claim 10 wherein said valve member comprises a resilient body adapted to seat, at said other end, a pair of telescoping portions between said resilient body and said camming surface, and at least one spacer between said portions for varying the effective length of said portions.

12. The sphygmomanometer defined in claim 1, further comprising timer means actuatable by said rotatable ring for indicating elapsed time.

13. The sphygmomanometer defined in claim 12 wherein said timer means comprises an actuating lever and operating means connecting said lever to said ring for actuation thereby.

14. The sphygmomanometer defined in claim 13 wherein said ring is formed with a boss engageable with said operating means.

15. The sphygmomanometer defined in claim 1, further comprising a bayonet joint between said meter means and said housing.

16. The sphygmomanometer defined in claim 1, further comprising a threaded joint between said meter means and said housing.

17. A sphygmomanometer, comprising in combination with a fluid-pressurizable blood-flow-restricting sleeve:
- an elongated cylindrical housing having a relatively stiff cylindrical core formed with a laterally open hollow over most of its length;
- hand-actuatable pump means in said housing connectable with said sleeve for pressurizing same, said pump means including a relatively elastic skin over said core spanning said hollow and forming therewith a substantially airtight chamber extending over most of the length of said housing;
- a meter on an end of said housing for indicating a fluid-pressure level in said sleeve;
- a bayonet coupling between said meter and said core, said meter and said housing being of the same diameter at said coupling;
- a rotatable ring surrounding said housing at said end, said ring further overlapping a portion of said meter and a portion of said housing, said ring having an eccentric surface; and
- a valve in said housing operable by said ring between a first position bleeding said chamber to the atmosphere and a second position isolating said chamber from the atmosphere, said valve including a passage formed in said core and communicating with said sleeve, a port formed in said meter communicating between said passage and the atmosphere, and a valve member shiftable transversely of said housing for blocking said port and engaging said surface.